US009825691B2

(12) United States Patent
Koskiahde et al.

(10) Patent No.: US 9,825,691 B2
(45) Date of Patent: Nov. 21, 2017

(54) RELAYING FRAMES

(71) Applicant: Flexibilis Oy, Tampere (FI)

(72) Inventors: Timo Koskiahde, Koura (FI); Jouni Kujala, Tampere (FI)

(73) Assignee: FLEXIBILIS OY, Tampere (FI)

( * ) Notice: Subject to any disclaimer, the term of this patent is extended or adjusted under 35 U.S.C. 154(b) by 40 days.

(21) Appl. No.: 14/440,262

(22) PCT Filed: Nov. 14, 2012

(86) PCT No.: PCT/FI2012/051112
§ 371 (c)(1),
(2) Date: May 1, 2015

(87) PCT Pub. No.: WO2014/076354
PCT Pub. Date: May 22, 2014

(65) Prior Publication Data
US 2015/0295635 A1    Oct. 15, 2015

(51) Int. Cl.
*H04B 7/155* (2006.01)
*H04L 12/703* (2013.01)
(Continued)

(52) U.S. Cl.
CPC ..... *H04B 7/15542* (2013.01); *H04L 12/2863* (2013.01); *H04L 45/28* (2013.01); *H04L 47/34* (2013.01)

(58) Field of Classification Search
None
See application file for complete search history.

(56) References Cited

U.S. PATENT DOCUMENTS

2004/0062248 A1   4/2004  Nagarajan et al.
2007/0223533 A1*  9/2007  Kirrmann ............... H04L 1/22
                                                        370/469
2012/0257626 A1  10/2012  McGhee et al.

FOREIGN PATENT DOCUMENTS

EP    1 511 214 A2    3/2005
EP    1657888 A1      5/2006
(Continued)

OTHER PUBLICATIONS

Heine, H. et al: "The High-Availability Seamless redundancy protocol (HSR): Robust fault-tolerant networking and loop prevention through duplicate discard," Factory Communication Systems (WFCS), 2012 9th IEEE International Workshop on, pp. 213-222, May 21-24, 2012. Figure 5; section 3.1, and section 4.1 paragraphs.*

(Continued)

*Primary Examiner* — Kouroush Mohebbi
(74) *Attorney, Agent, or Firm* — Hoffmann & Baron, LLP

(57) ABSTRACT

Frames received at a redundant port connecting a node to a communications network are identified by the frames including a sequence number associated with a source. A frame is received at the redundant port from a source. A newest sequence number of frames received from the source at the node is determined. A window of frames from the source is determined by corresponding sequence numbers. The window includes sequence numbers preceding the newest sequence number and associated with reception information of a corresponding frame at the node. The node relays the frame, when a sequence number of the received frame is within the window and the reception information indicates a first reception of the frame at the node.

18 Claims, 6 Drawing Sheets

(51) Int. Cl.
*H04L 12/28* (2006.01)
*H04L 12/801* (2013.01)

(56) References Cited

FOREIGN PATENT DOCUMENTS

EP   2090950 A1   8/2009
EP   1 511 214 A3   12/2009

OTHER PUBLICATIONS

Weibel, Hans, "Tutorial on Parallel Redundancy Protocol (PRP)", http://ines.zhaw.ch/prp/, 20 pages, Jan. 8, 2008.
Supplementary European Search Report, EP 12 88 8470, Jun. 29, 2016.
Heine H. et al., "The High-Availability Seamless Redundancy Protocol (HSR): Robust Fault-Tolerant Networking and Loop Prevention Through Duplicate Discard", Factory Communication Systems (WFCS), pp. 213-222 (2012).
Xiaozhuo, J., "High-Availablity Seamless Ring Protocol Implementation in FPGA", Master Thesis, Retrieved from internet: <URL: ftp://ftp.tik.ee.ethz.ch/pub/students/2008-HS/MA-2008-19.pdf>, pp. 1-111 (2009).
International Search Report for corresponding PCT application PCT/FI2012/051112, pp. 1-4, (Jul. 12, 2013).
Industrial Communication Networks: High Availability Automation Networks, International Electrotechnical Commission, 303 pages, Nov. 21, 2008.

* cited by examiner

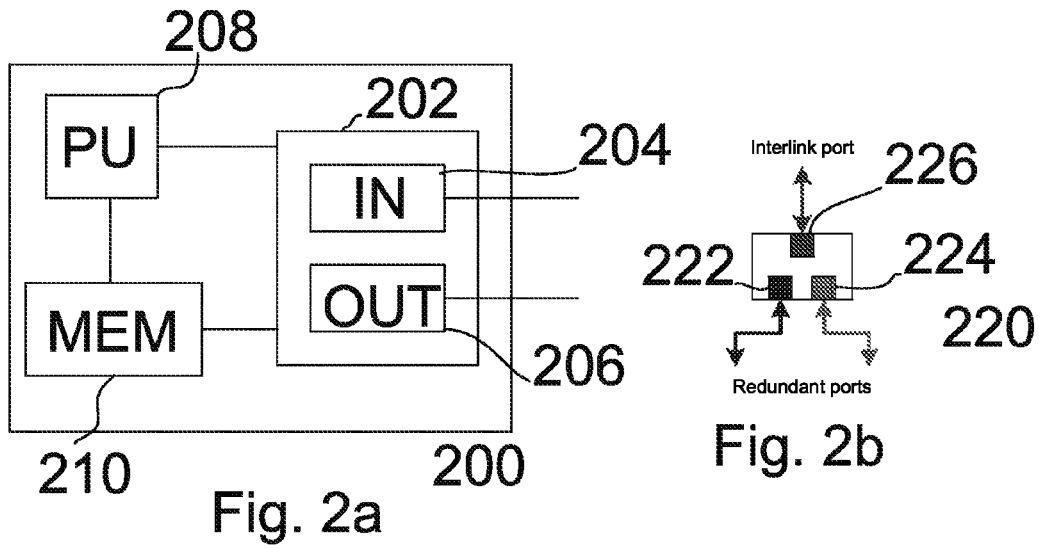
Fig. 2a
Fig. 2b
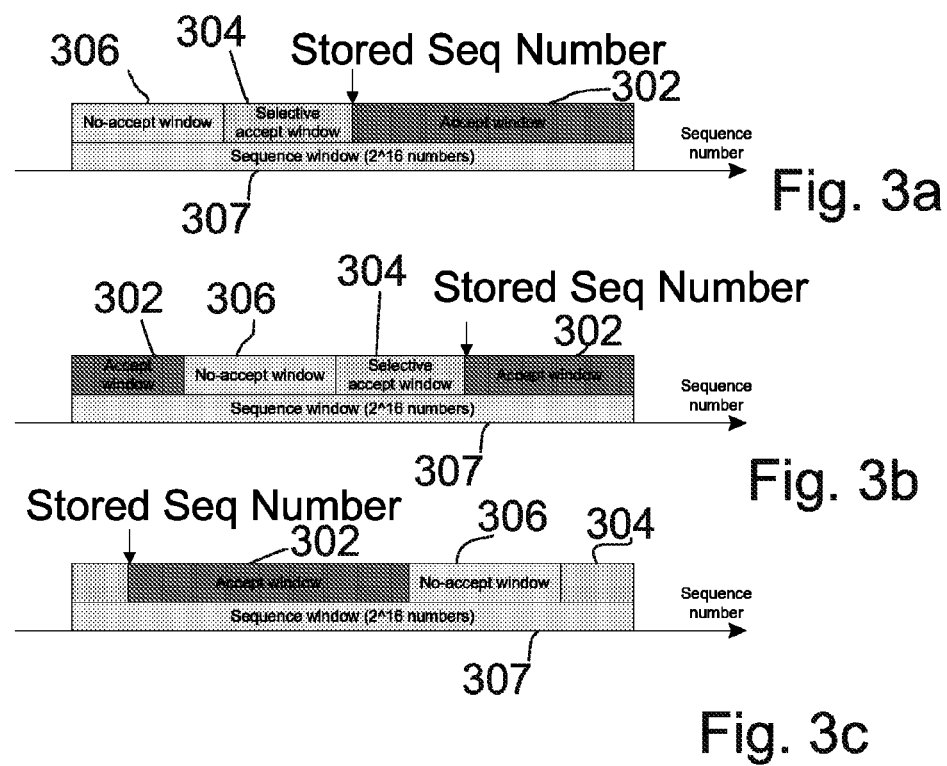
Fig. 3a
Fig. 3b
Fig. 3c

RELAYING FRAMES

CROSS-REFERENCE TO RELATED APPLICATION

This application is a National Stage application of International Application No. PCT/FI2012/051112, filed Nov. 14, 2012, which is incorporated by reference herein in its entirety.

BACKGROUND

Field

The present invention relates to relaying frames by a redundant port and more particularly to duplicate detection in communications involving redundancy.

Description of the Related Art

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Several communications protocols provide redundant communications using duplicate messages thereby ensuring that the message is received by the destination. IEC 62439-3 Edition 2 defines two redundancy protocols: Parallel Redundancy Protocol (PRP) and High-availability Seamless Redundancy (HSR) protocol.

Both PRP and HSR operate on Ethernet link layer, which is layer 2 of the Open Systems Interconnection (OSI) model. The operation of both PRP and HSR is fully transparent for the layers above: while the source sends duplicates, the receiver must be able to remove duplicates and it delivers only a single frame to the layers above.

The PRP and HSR protocols define that a source address together with a sequence number shall be used for detecting duplicates. The both HSR and PRP include both a source Medium Access Control (MAC) address and a 16 bit sequence number in every frame that is sent. The HSR/PRP source node adds the sequence numbers to the frames. A sequence number is source MAC address specific, i.e. every source has its own running sequence number that is incremented by one for every frame sent to the PRP/HSR network. The HSR/PRP node sends the same data duplicated via two paths with the same sequence number.

When the two paths do not have faults, the duplicate frames are received via both paths at the destination node. However, since only one frame is needed at the destination node, the duplicates need to be discarded. Failing to identify duplicates and to discard correct frames may prevent optimal operation of upper layer protocols, e.g. those on top of UDP or layer 2 and those that have not been designed to deal with duplicates. Furthermore, duplicate frames increase the network load and the load of the nodes processing the received frames.

SUMMARY

According to an aspect of the invention there is provided a method comprising identifying frames received at a redundant port connecting a node to a communications network by the frames including a sequence number associated with a source, receiving a frame at the redundant port from a source, determining a newest sequence number of frames received from the source at the node, determining a window of frames from the source by corresponding sequence numbers, said window comprising sequence numbers preceding the newest sequence number and associated with reception information of a corresponding frame at the node, relaying the frame by the node, when a sequence number of the received frame is within the window and the reception information indicates a first reception of the frame at the node.

According to another aspect of the invention there is provided an apparatus comprising at least one processor, and at least one memory including computer program code, the at least one memory and the computer program code configured to, with the at least one processor, cause the apparatus at least to perform a method according to an aspect.

According to another aspect of the invention there is provided an apparatus comprising means configured to perform a method according to an aspect.

According to another aspect of the invention there is provided a computer program product comprising executable code that when executed, cause execution of functions of a method according to an aspect.

According to another aspect of the invention there is provided a record medium storing a data structure for detecting duplicate frames received at a redundant port connecting a node to a communications network, whereby frames are identified by including a sequence number associated with a source, said data structure comprising a source address stored in association with a newest sequence number of frames received from the source address at the node, and a memory pointer to reception information determined for each frame within a window of frames from the source by corresponding sequence numbers, said window comprising sequence numbers preceding the newest sequence number and associated with reception information of a corresponding frame at the node.

According to another aspect of the invention there is provided a system comprising one or more apparatuses according to an aspect.

Although the various aspects, embodiments and features of the invention are recited independently, it should be appreciated that all combinations of the various aspects, embodiments and features of the invention are possible and within the scope of the present invention as claimed.

Some embodiments may provide a solution for duplicate detection of frames in redundant communications. This may facilitate accepting frames from different redundant paths having different travel times paths between a source and a receiver.

Some embodiments provide a solution for duplicate detection of frames in redundant communications facilitating different protocols to be used in redundant ports of a node supporting redundant communications.

Some embodiments provide an efficient way to store reception information of received frames.

Further advantages will become apparent from the accompanying description.

BRIEF DESCRIPTION OF THE DRAWINGS

In the following the invention will be described in greater detail by means of preferred embodiments with reference to the accompanying drawings, in which

FIG. 2*a* illustrates a block diagram of an apparatus according to an embodiment;

FIG. 2*b* illustrates an architecture of apparatus according to an embodiment;

FIGS. 3*a*-3*c* illustrate windowing for determining duplicate frames according to an embodiment;

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following description detection of duplicate frames received at a redundant port will be described in the context of PRP and HSR protocols and a network node implementing a HSR and/or PRP. However, it should be appreciated that the described embodiments may be applied also with other redundancy protocols and network nodes supporting redundancy.

In PRP and HSR a source address together with a sequence number of a frame may be used for detecting duplicates. HSR and PRP frames include both a source MAC address and a 16 bit sequence number in every frame that is sent. A HSR/PRP source node adds sequence numbers to the frames. A sequence number is source MAC address specific, i.e. every source has its own running sequence number that is incremented by one for every frame sent to the PRP/HSR network. The HSR/PRP node sends the same data in a redundant manner by duplicating the frame and sending the duplicates via two paths with the same sequence number. The receiver is able to detect if a received frame is a duplicate by checking if a frame with the same sequence number is already received from the same source MAC address. A sequence number is 16-bit value, which means that it overwraps after (2^16=) 65536 frames sent.

It should be appreciated that the number of redundant paths between a source and a destination may be greater than two, e.g. 3, 4 or any number, depending on implementation. Thereby, apparatuses supporting redundant communications on the redundant paths are provided with a number of ports corresponding to the number of paths.

Figure 1A:
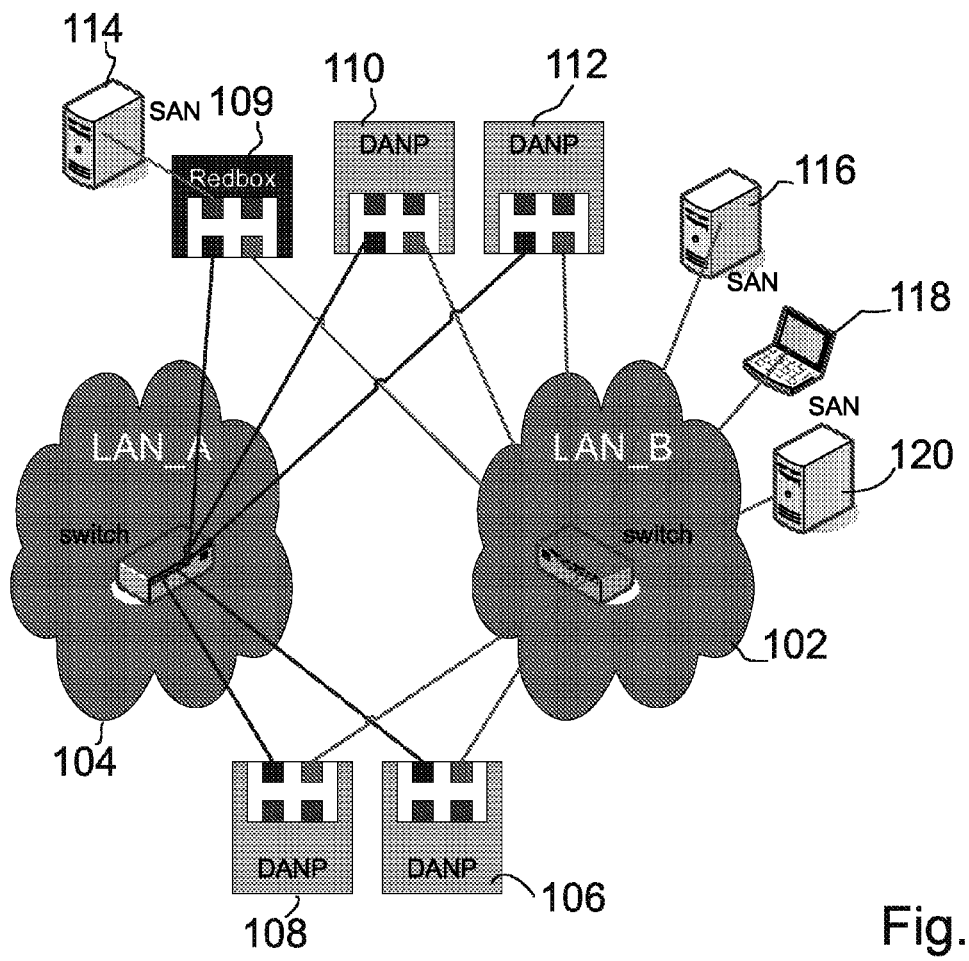
FIG. 1a illustrates a network architecture for carrying out an embodiment.

FIG. 1*a* illustrates a network architecture for carrying out an embodiment. A Local Area Network A (LAN_A) 104 and a LAN_B 106 are separate LANS both employing a star topology, in star topology each frame is communicated via a central node in the network, e.g. switch. The central node relays frames received from a connected device to the other devices connected to the central node. Doubly Attached Nodes (DANs) 106, 108, 109, 110, 112 are connected to both of the LANs, thereby supporting redundancy in communications. Each of the LANS may also be connected to other devices than DANs for example Singly Attached Nodes (SANs) 114, 116, 118, 120.

A source DAN duplicates each frame and sends the duplicates on both LANs. In this way a receiving DAN connected to the same LANs can receive the frame via two separate paths. In this way failure of one of the paths does not prevent the reception of the frame via the other path. A SAN may also be connected redundantly, by connecting it to the double star topology network though a device supporting redundancy in communications, a RedBox 109.

Figure 1B:
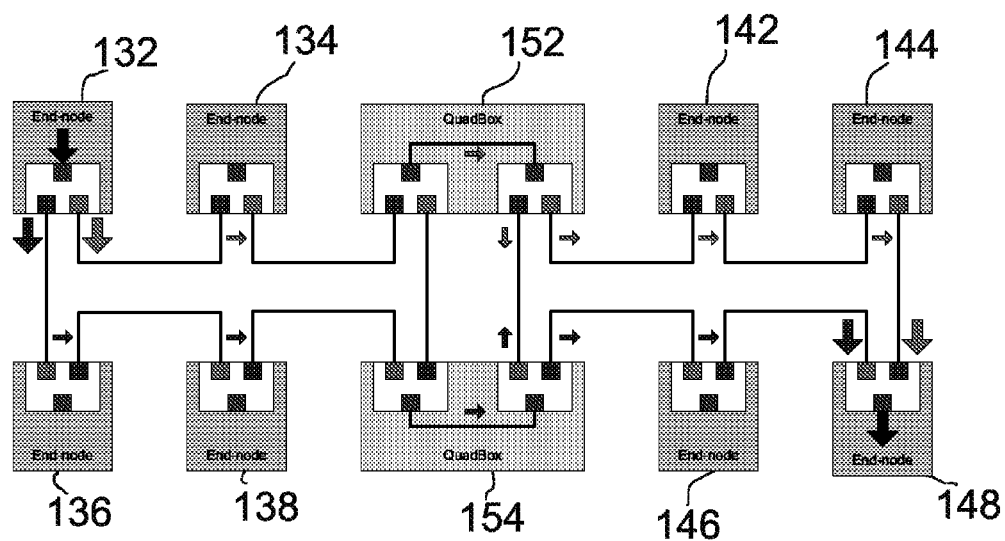
FIG. 1b illustrates another network architecture for carrying out an embodiment.

FIG. 1*b* illustrates another network architecture for carrying out an embodiment. DAN 132, 134, 136, 138, 142, 144, 146 and 148 are connected to a ring topology network. Each DAN in the ring topology network is connected to neighboring nodes and relays frames received from one neighbor node to the other neighbor node. In the illustrated example of the ring topology, the DANs 132, 134, 136 and 138 are connected to a first ring and the 142, 144, 146 and 148 are connected to a second ring. The two rings are redundantly interconnected by two paths between the rings provided by, QuadBoxes 152 and 154. The QuadBoxes may be implemented by a DAN in each ring topology network connected by a non-redundant connection. When two rings are connected in this way, frames are redundantly communicated within each ring and between the rings connected by the QuadBoxes.

FIG. 2*a* is a block diagram of an apparatus 200 according to an embodiment. Although the apparatus has been depicted as one entity, different modules and memory may be implemented in one or more physical or logical entities. The apparatus may comprise a network node supporting redundancy in communications. The redundancy may be provided by redundancy in hardware components e.g. redundant ports, and/or redundancy in functionality, e.g. sending redundant frames. In redundant communications, the apparatus sends each frame redundantly. The redundancy may be provided by a number of connections used to send the frames, e.g. two or more separate connections. In one example this is achieved by the apparatus comprising a port corresponding to each connection. Having separate hardware, e.g. port for each redundant path provides sending redundant frames simultaneously, thereby without delays between frames sent on different paths. This is especially advantageous in real-time communications.

The apparatus 200 comprises an interfacing unit 202, a central processing unit (CPU) 208, and a memory 210, that are all being electrically interconnected. The interfacing unit comprises an input 204 and an output unit 206 that provide, respectively, the input and output interfaces to the apparatus. The memory may comprise one or more applications that are executable by the CPU. The input and output units may be configured or arranged to send and receive data, frames, packets and/or messages according to one or more protocols. Examples of the protocols comprise data link layer protocols including Medium Access Control (MAC) protocols defined by IEEE 802.3 Ethernet and IEEE 802.11 Wireless Local Area Network, WLAN, also known as the wireless Ethernet. However, it should be appreciated that the protocols may include any other protocol on the layer 2 of the OSI model that provides the functional and procedural means to transfer data between network entities.

Different parts of the apparatus 200 may be combined into a single unit to provide the functionality of the parts. Accordingly, the input 204 and output units 206 may be combined into a single unit providing the reception and sending of information.

In an embodiment, the apparatus comprises two or more interfacing units, i.e. ports, through which frames can leave and/or enter the apparatus. The two or more ports are redundant such that the apparatus sends each frame via each of the ports. The frames are preferably sent simultaneously in order to avoid any delays between the frames, as delay is undesirable especially in real-time communications.

In an embodiment the apparatus may comprise two or more redundant ports and a non-redundant port, whereby frames from the redundant port are sent via the redundant ports and each frame from the redundant ports is sent only once through the non-redundant port.

In an embodiment the input 204 unit may provide circuitry for obtaining data, frames, packets and/or messages to the apparatus. The obtaining may comprise receiving radio frequency signals by an antenna, for example. In another example the obtaining by the input unit may comprise receiving an electrical signal on a wired connection In an embodiment the output unit 206 may provide circuitry for transmitting data, frames, packets and/or messages from the apparatus. The transmitting may comprise transmitting radio frequency signals by an antenna, for example. In another example the transmitting may comprise transmitting an electrical signal on a wired connection.

In an embodiment, the apparatus may provide redundant communications by connecting to a communications network on a data link layer with a plurality of redundant ports. Accordingly, the apparatus may comprise two or more redundant ports implementing the same protocols or different protocols. The protocols may be data link layer protocols. Examples of the different protocols may comprise those explained above. When the different data link layer protocols define different physical layer protocols, e.g. by the Ethernet defining a wired physical layer and the WLAN defining a wireless physical layer, the redundant ports implementing different data link layer protocols may further implement different physical layers. In this way the redundant paths are separated by the physical medium used for transferring the frames, e.g. a wireless medium and a wired medium in case WLAN and Ethernet are used.

In an embodiment, apparatus may comprise two or more redundant ports implementing Ethernet and two or more redundant ports implementing WLAN. In this way the apparatus may provide redundancy in communications in both wired and wireless networks. The apparatus may be further provided with a non-redundant port for communications between the two networks. In this way the apparatus may operate as QuadBox as illustrated in FIG. 1b, between a first ring formed by a WLAN network of DANs 132, 134, 16 and 138 and a second ring formed by an Ethernet network of DANs 142, 144, 146, and 148. Accordingly, wired and wireless networks may be redundantly connected.

FIG. 2b illustrates an architecture of apparatus 220 according to an embodiment. The apparatus may be implemented by the functional block of FIG. 2a, for example. The apparatus comprises two redundant ports 222 and 224 and an interlink port 226. The redundant ports support redundancy in communications as explained above. The interlink port is a non-redundant port. Thereby a frame received by one of the redundant ports is only sent once to the interlink port. Thereby, duplicate frames received after the first frame are not forwarded and they may be e.g. dropped, i.e. discarded. The apparatus 220 may be used in the DANs illustrated in FIGS. 1a and 1b.

Figure 4:
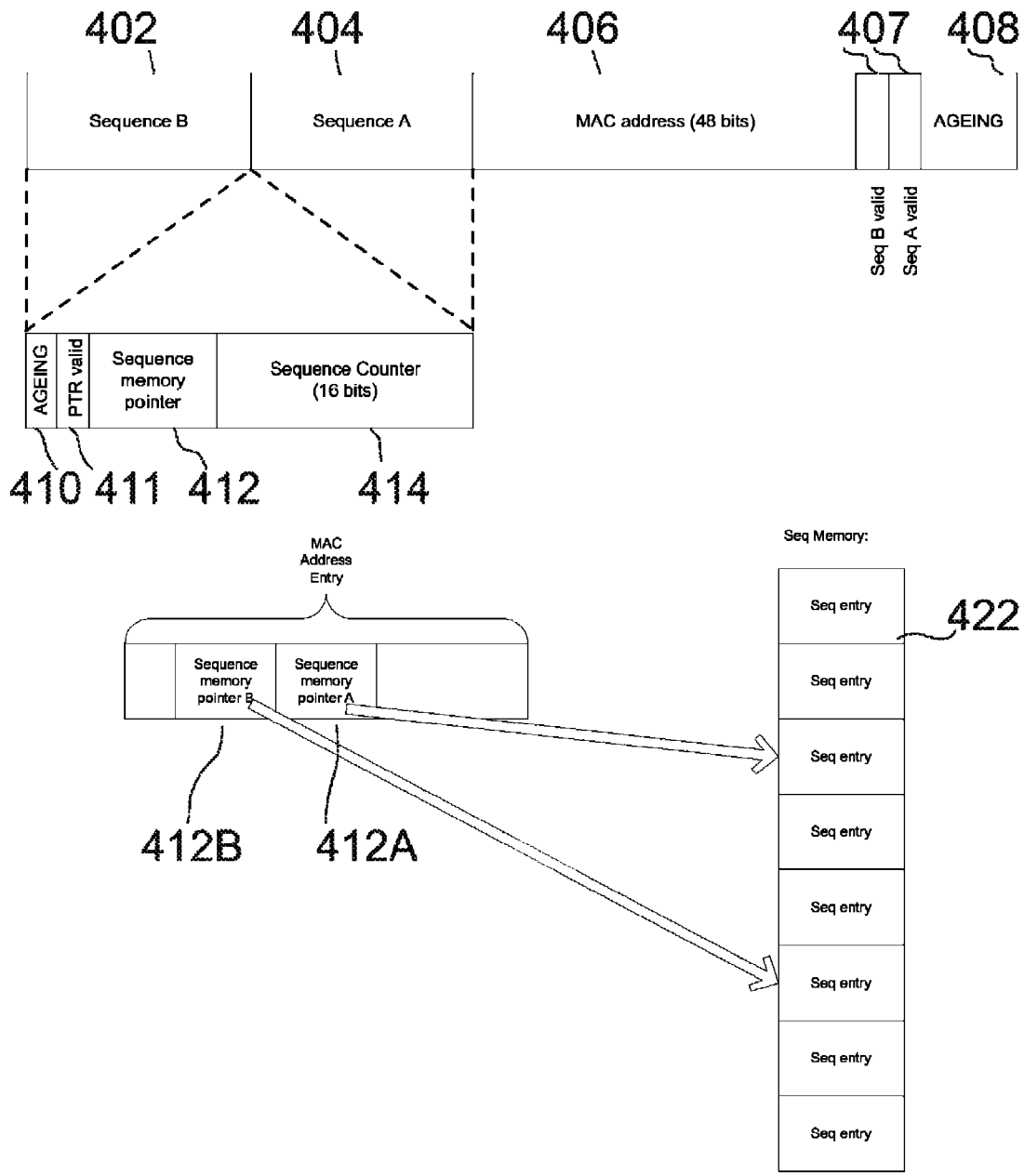
FIG. 4 illustrates data structures for duplicate detection according to an embodiment.
Figure 6:
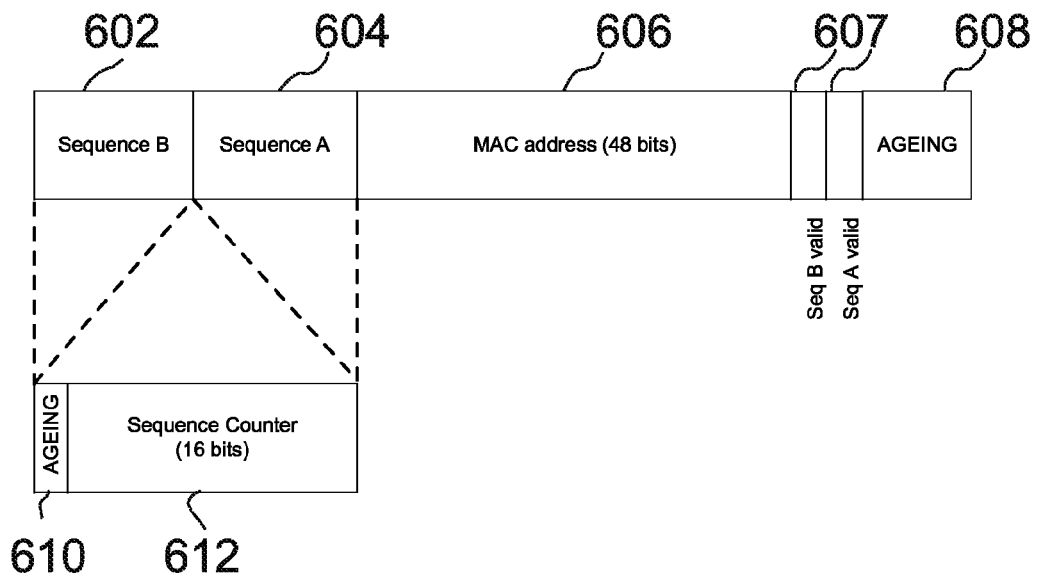
FIG. 6 illustrates data structures for duplicate detection according to an embodiment.
Figure 6:
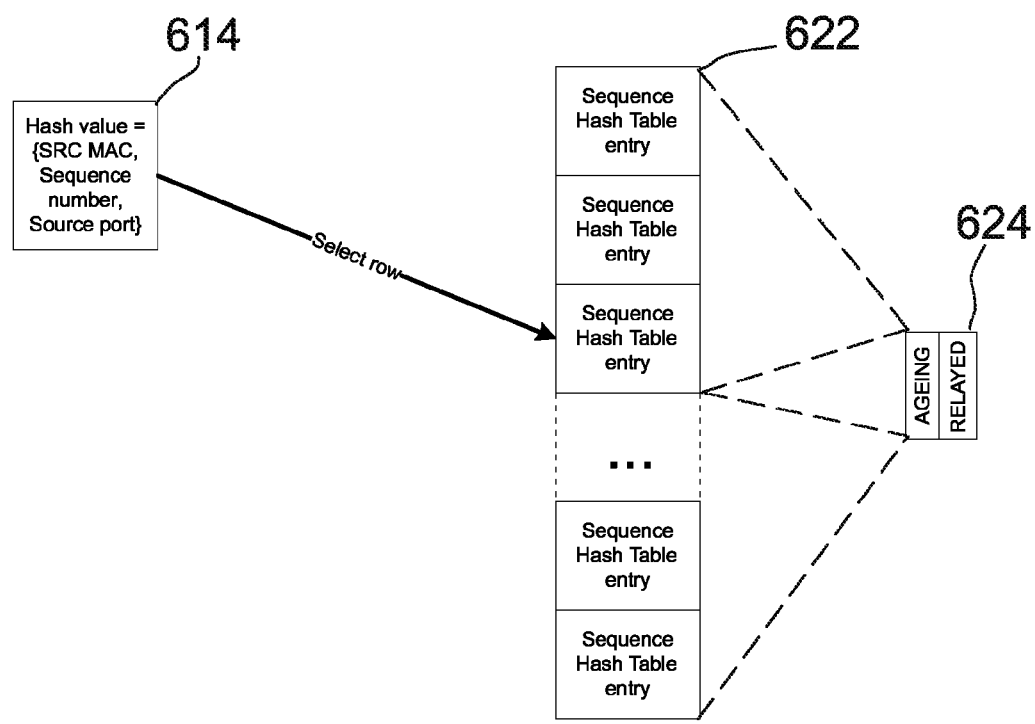

In the following a method for duplicate detection according to an embodiment illustrated in FIG. 7 will be explained with reference to FIG. 3 illustrating windowing for determining duplicate frames according to an embodiment. FIGS. 4 and 6 will be referred to for examples of data structures for duplicate detection according to some embodiments.

In the data structure of FIG. 4, a source address 406 is stored in association with a newest sequence number 402, 404, 414 of frames received from the source address at a redundant port and a memory pointer 412 to reception information 422 determined for frames with sequence numbers within a selective accept window 304. Accordingly, each port has its own memory pointer 412A, 412B and newest sequence number 414. The reception information is stored within a sequence entry within a sequence memory of the apparatus storing reception information for frames received from sources at redundant ports. The sequence memory entry comprises reception information for all frames within the selective accept window 304. Reception information may be accessed within the sequence entry uniquely for reading and updating the reception information by a modulo operation: (sequence number) mod (sequence memory entry size).

Similarly to FIG. 4, also in FIG. 6 a source address 606 is stored in association with a newest sequence number 602, 604, 612 of frames received from a source address at each redundant port. A memory pointer to access reception information 622 of each sequence number within a selective accept window 304 is determined by a hash function 614 calculated over the source address 606, sequence number of the frame and the source port. The hash function provides simplicity in the memory structure of the solution and makes the solution scalable. The memory structure may be kept simple and the solution is easily scalable in different scenarios for example from a scenario with a low number of addresses and a high amount of traffic, to a scenario where the amount traffic is low but the number of addresses is high.

The above explained data structures of FIGS. 4 and 6 are referred to in the following as MAC address entries. In the described MAC address entries only two redundant ports, A and B, are described, but it should be appreciated that the number of ports may also be higher.

Figure 7:
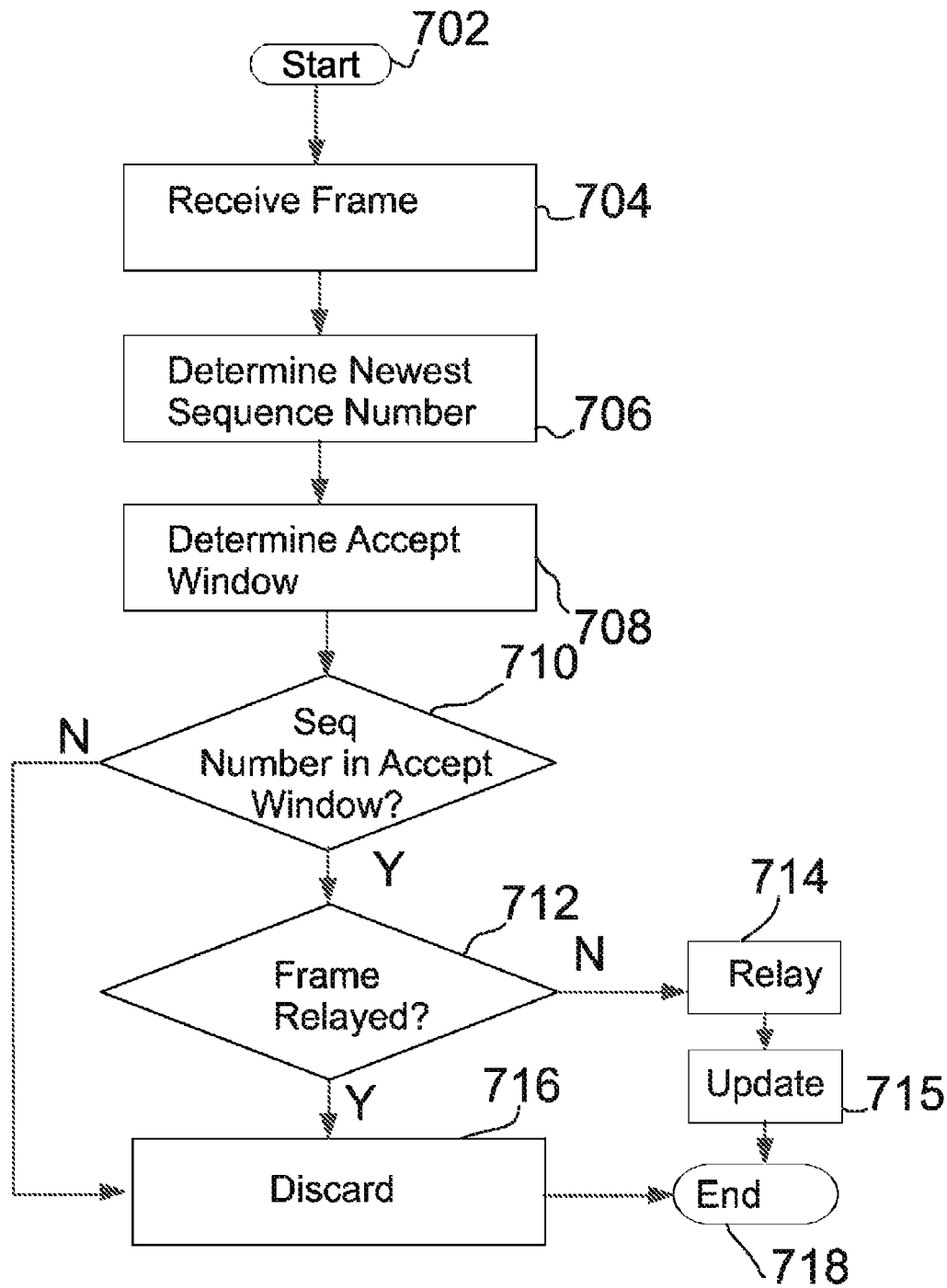
FIG. 7 illustrates a method for duplicate detection according to an embodiment.

The method of FIG. 7 starts in 702, where an apparatus is redundantly connected by two or more ports. The apparatus has data structures to maintain a windowing illustrated in FIG. 3 corresponding to each source node and redundant port. The ports may be connected to other LANs as in FIG. 1a and/or to other network nodes as in FIG. 1b. A received frame at a redundant port may be identified by a sequence number associated with a source. The association of the source address and the sequence number may be established by the source address being included in the received frame as with HSR/PRP protocols. Accordingly, frames from each source are identifiable by a source address and a sequence number within each frame assigned by the source. It should be appreciated that the described method is explained for frames received by a redundant port, since the redundant ports are the source of the duplicate frames. However, the apparatus may also receive frames from non-redundant ports also for which duplicate detection is not necessary.

In 704 a frame is received at a redundant port from a source. The source address may be derived from the frame and determined whether the source address is already known, e.g. one or more frames has been received from the same source earlier, or if the source address is new. When the source address is new, the source address may be stored in a data structure illustrated by FIG. 4 or 6 with the sequence number of the frame and port information. The port information may be implicitly stored by the field the sequence number is stored in the data structure.

In an embodiment, a MAC address entry may include aging information 408, 608. The aging information invalidates the windowing defined by the MAC address entry after predetermined time, if the windowing is not updated during the predetermined time. The MAC address entry may include a field 407, 607 for storing information on the validity of the windowing. Since the windowing may be specific to each port, each window may have its own validity field.

In an embodiment, the stored newest sequence number 414, 612 for each port may be stored in the MAC address entry with aging information 410, 610 and the MAC address entry may include a separate aging information for the selective accept window. The aging information of the selective accept window may comprise aging information of the reception information. In the data structure of FIG. 4, the aging information invalidates the sequence memory pointer after a predetermined time, thereby invalidating reception information of all frames within the selective accept window. In the data structure of FIG. 6 the aging information is stored together with the reception information of a frame, thereby invalidating the reception information of the single frame. The validity of the newest stored sequence number may be stored in a validity field corresponding to the port of the newest sequence number. Similarly the validity of the selective accept window may be stored in a validity field corresponding to the port of the selective accept window.

If validity field indicates invalidity, e.g. by comprising a zero bit, it means that the associated field does not contain usable information and it shall not be used. For example, if Sequence B 402, 602 valid bit 407, 607 is zero, Sequence B does not contain valid information and shall not be used in duplicate detection.

In 706 a newest sequence number received from the source at the redundant port is determined. When the source address of the received 704 frame is new, the sequence number of the received frame may be determined 706 as the newest sequence number from the source and stored associated with the source MAC address to identify the newest sequence number received by the redundant port. The MAC entries illustrated in FIGS. 4 and 6 may be used to store the newest sequence number.

In an embodiment, the source address of the received 704 frame may be known and thereby is not new. Then, the sequence number of the received frame may be compared with a currently newest sequence number that has been received from the same source and the redundant port. The current newest sequence number may be stored in the MAC entries of FIGS. 4 and 6 for example. If the received sequence number is newer than the currently stored sequence number, the received frame is within an accept window 302 and the windowing may be updated 715 by determining the received sequence number as the newest sequence number.

When sequence numbers are compared to determine 706 the newest sequence number, a sequence number may be determined to be newer if it is assigned by a source to a transmitted frame later than the other sequence number. In PRP/HSR sequence numbers are assigned by a source node from sequence number space in an incremental order and wrapped around at the maximum value of the sequence numbers, e.g. 2^16 in PRP/HSR. Accordingly, the source assigns sequence numbers to frames from a rotational sequence of sequence numbers.

In an embodiment, a windowing including one or more windows 302, 304, 306 defined in a sequence window 307 may be determined 708 on the basis of a newest sequence number received from a source at a redundant port. The sequence window 307 defines sequence numbers in their order of assignment to frames. The window 302, 304, 306 may be determined as a continuous part of the sequence window on the basis of sequence numbers between a first sequence number and a last sequence number within the window.

It should be appreciated that sequence numbers may be assigned from a sequence window in a circular manner. Accordingly, after the last sequence number in the sequence window is assigned to a frame, the next sequence number that is assigned is the first sequence number in the sequence window. Accordingly, a window 302, 304, 306 may continue from a last sequence number in a sequence window 307 to the beginning of the sequence window. Accordingly, the window 302, 304, 306 may continue by the sequence window wrapping around from the end of the sequence window to the beginning. This is illustrated by window 302 in FIG. 3b and window 304 in FIG. 3c.

A selective accept window 304 may be determined between a first sequence number within the selective accept window and a newest sequence number received from a source at a redundant port.

An accept window may be determined between a newest sequence number and the last sequence number within the accept window received from a source at a redundant port.

A no-accept window 306 may be determined as sequence numbers that are not included in the windows indicating frame numbers of frames that may be always and/or conditionally accepted i.e. the selective accept window 304 and the accept window 302. Accordingly, frames within the accept window may always be accepted and frames within the selective accept window may be accepted conditionally, on the basis of a reception information indicating the frame as a new frame.

In an embodiment, the newest sequence number associated with a source determines 708 a selective accept window 304 comprising sequence numbers preceding the newest sequence number and associated with reception information of corresponding frames at the redundant port. The reception information defines for each frame whether a frame with a sequence number within the window has been received at the redundant port. Accordingly, in an embodiment the selective accept window comprises received and non-received frames from a specific source at the redundant port.

It should be appreciated that having a single window, a selective accept window, may be advantageous in implementations, where all the frames in the selective accept window should be received before accepting frames with sequence numbers following the newest sequence number defining the selective accept window.

In an embodiment, more than one window may be determined 708 for a port and specific to a source. In addition to the selective accept window 304 providing conditional acceptance of received frames, an accept window 302 may be determined as comprising sequence numbers following the newest sequence number. Then received frames having a sequence number within the accept window may be accepted at a redundant port. Thereby, the accept window 302 provides automatic acceptance of frames falling within the window and may be considered as an always accept window compared to the selective accept window 304, since the received frames falling within the selective accept window need further checking in addition to the checking of the sequence number of the received fame to determine further processing of the frame, for example whether the frame needs to be relayed. Accordingly the received frames in both windows may be accepted. However, since the accept window 302 includes sequence numbers following the current newest sequence number, they are assigned by the source after the current newest sequence number. Thereby, the frames within the accept window are new and reception information does not have to be checked for determining duplicates of such frames. When the received 704 frame has a sequence number within the accept window 302, the sequence number of the received frame may be determined 706 as the newest sequence number. Having an accept window and a selective accept window provides reception of frames out of order from different redundant paths. In this way different travel times between a source and receiver caused by e.g. frames travelling different paths due to some of the paths failing, may be accepted for received frames. The selective accept window provides reception of frames having a sequence number preceding the newest sequence number stored, and the accept window provides accepting frames with a sequence number following the newest sequence number stored. Since the length of the selective accept window is defined by sequence numbers, the selective accept window facilitates accepting frames from different redundant paths having different travel times paths between the source and receiver.

In an embodiment, a third window, a no-accept window 306, may be determined 708 to define the sequence numbers that do not belong to the selective accept window 304 or the accept window 302. Then frames including a sequence number in the no-accept window may be discarded 716.

In 710 it is determined whether the sequence number of the received frame is within the window determined in 708. If the frame is not within the window, the process may proceed to discard 716 the frame. The applicable windows are the accept window and the selective accept window.

When the sequence number of the received frame is within a selective accept window, the reception information associated with the sequence number is checked 712 to determine whether a frame with the same sequence number has been received earlier. When the reception information indicates that a frame with the same sequence number has been received earlier, the frame may be discarded 716. In this way resources are not consumed in the apparatus for processing of the duplicate frames. When the reception information indicates that a frame with the same sequence number has not been received earlier, the frame may be accepted 714. Since the frame is not received before, it may be determined that it is not a duplicate and be processed further by the apparatus. The processing may comprise e.g. relaying the frame on the basis of a destination address within the frame or decoding the frame by higher layer protocols in the apparatus, e.g. Transport Control Protocol/Internet Protocol TCP/IP. In this way resources are not consumed in the apparatus for processing of the duplicate frames.

When the sequence number of the received frame is within an accept window, the frame is new and thereby it may be determined 712 that it has not been received before and/or relayed, and the frame may be accepted 714.

In 715 the windowing used at the redundant port for detecting duplicate frames may be updated. When the received frame was determined in 710 to be within the selective accept window, reception information corresponding to the sequence number may be set to indicate reception of the frame. The reception information for each frame may include a bit with a value '1' indicating reception of the frame and a value '0' the frame not being received.

When the received frame was determined in 710 to be within an accept window and following to a current newest sequence number from the same source and redundant port, the sequence number of the received frame may be determined as the newest sequence number. Then a new windowing may be determined on the basis of the new newest sequence number. The process ends after accepting or dropping the received frame in 718.

In an embodiment, the updating 715 may comprise updating the aging information within a MAC entry. The aging information may be reset, when the sequence number of the received 704 frame was determined as the newest sequence number. When the newest sequence number is not updated, the aging information may be updated to invalidate the associated MAC entry field after a predetermined time. This may be achieved in one example by the aging information including a counter that is decremented or incremented at defined time intervals towards a predetermined value of the counter indicating an invalid MAC entry field.

In an embodiment, when the apparatus comprises more than one redundant port and/or a non-redundant port, the received frame may be relayed 714 within the apparatus to the other ports of the apparatus. When the destination port of the relaying is a redundant port, the frame may be processed at the destination port to detect duplicates as described above starting from step 702.

Accordingly, as described above, frames that have been received within the selective accept window may be discarded 716 by the redundant port. In this way frames detected as already received before are not sent by the port to the network, however, non-redundant ports may still have the possibility to forward the frame received by the redundant port.

In an embodiment, the sequence number of the received frame is determined 706 as a newest sequence number when the received sequence number follows a current newest sequence number. The sequence number of the received frame is then used to update 715 the determined 708 windowing. The updating of the windowing is illustrated by the changes in window positions compared to a sequence window 307, when the newest sequence number is updated from FIG. 3a to FIG. 3b and further to FIG. 3c. Since the sequence numbers are assigned in an incremental order from the sequence window 307 and wrapping to the lowest sequence number when the highest sequence number is reached, the windowing used at the receiving redundant port also wraps around. This is illustrated in FIG. 3b by the accept window including sequence numbers in both ends of the sequence number window, and in FIG. 3c by the selective accept window including sequence numbers in both ends of the sequence number window.

Figure 5:
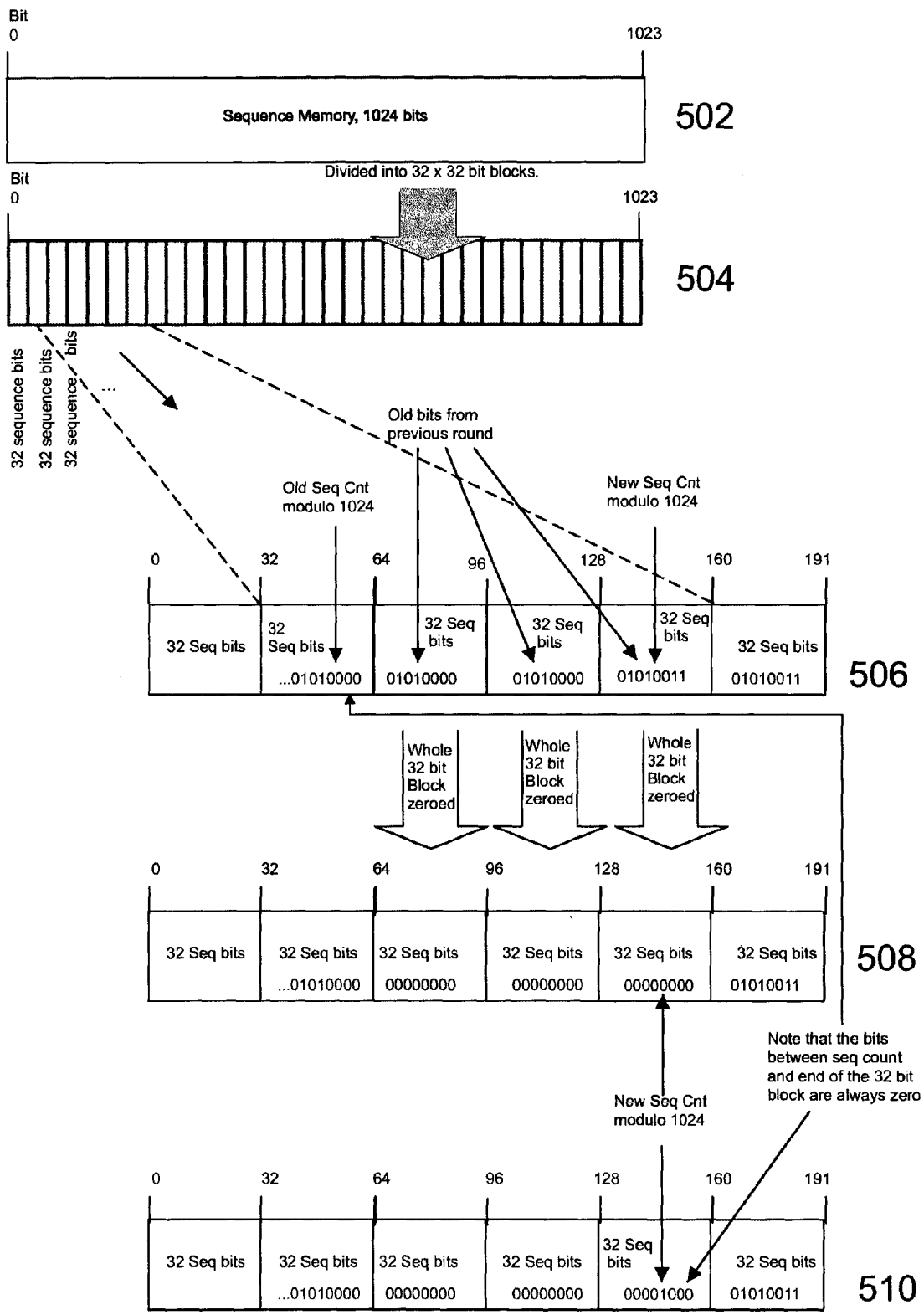
FIG. 5 illustrates a procedure and associated data structures for updating windowing used for duplicate detection according to an embodiment.

In an embodiment updating 715 the windowing comprises setting reception information of frames in a selective accept window 304 between the newest sequence number and the previous newest sequence number to indicate zero receptions of each frame at the redundant port. A procedure and associated data structures for updating windowing used for duplicate detection according to an embodiment is illustrated in FIG. 5. In the procedure, reception information of a frame is stored in a sequence of indicators each of which corresponds to a frame with a sequence number within the selective accept window.

In an embodiment, updating 715 the windowing comprises moving a determined window 708 within the sequence window 307. Accordingly, the updating may comprise determining a first and a last sequence number within the window. When the window length is kept constant the first and the last sequence number are updated by the same number of sequence numbers.

In some embodiments, more than one window 302, 304, 306 are determined for sequence numbers. A selective accept window 304 comprises sequence numbers assigned before the stored newest sequence number and includes reception information of frames within that window, i.e. frames with sequence numbers within that window. Due to the updating 715 of the windowing as illustrated in FIGS. 3a to 3c, the sequence numbers within each window change. Accordingly, a sequence number previously in a selective accept window may after updating be included in a no-accept window. On the other hand a sequence number previously in a no-accept window, may after updating belong to the accept window. Since the windowing wraps around the sequence window 307, reception information associated with sequence numbers within the selective accept window have to be updated with the windowing so that the reception information correctly reflects the reception status of each frame within the selective accept window 304. Accordingly, the updating may comprise re-setting reception information when the selective accept window is updated to avoid the selective accept window including reception information from previous rounds of the windowing.

In FIG. 5, the reception information is stored in sequence memory 502, 504 including the reception information of the selective accept window corresponding to sequence numbers of frames. The size of the selective accept window in this example is 304 of 1024 bits (32 blocks*32 bits), however also other lengths may be used depending on implementation. The sequence memory may store reception information for frames received from a specific source 406, 606 at a plurality of redundant ports 412A, 412B.

In the illustrated procedure of FIG. 5 the reception information is re-set in a block-wise manner in N bits wide blocks, where N=32 in this example. However, it should be appreciated that also bit-wise re-setting is possible, but the block-wise re-setting of the reception information requires less memory operations than the bit-wise re-setting. Thereby, the block-wise resetting may be preferred in high traffic scenarios, where available processing resources for the frames need to be optimized between multiple tasks only one of the tasks being the re-setting of the reception information. Although, the block size N in the example is selected as 32 bits, also other values may be chosen depending on implementation.

In 508 the reception information of frames between the newest sequence number and the previous newest sequence number are set to indicate zero receptions of each frame at the redundant port. When the reception information comprises a single bit as in the example of FIG. 5, the '0' bit may indicate no reception, and the '1' bit may indicate a reception of a frame.

In an embodiment, if a difference of the newest sequence number and the previous newest sequence number is greater than the size of the sequence memory, the reception information is re-set, for example all 32 bit blocks are zeroed in 508.

In the block-wise re-setting of the reception information, the block including the previous newest sequence number is the block with bits indexed between 32 and 64. The new newest sequence number is in the block of bits indexed between 128 and 160. The newest sequence number and the previous newest sequence number indicate the blocks that are re-set. This may be performed by a modulo operation executed on the newest and the previous newest sequence number over the length of the sequence memory, sequence number modulo 1024 bits. The result of the modulo operation indicates the block holding the sequence number and the reception information of the frame corresponding to the sequence number. It should be appreciated that the modulo operation may be used also in the bit-wise re-setting of reception information to indicate reception information, for example the reception information corresponding to the newest sequence number.

The blocks of bits following the block including the old sequence number up to and including the block of the new newest sequence number are set to zero in 508. This may be performed by a logical operation on the selected blocks 506 including the reception information. Accordingly, the logical operation on the block comprising the reception information may be performed for all the blocks.

In 510 the reception information of the new newest sequence number is set to '1' to indicate reception. If in the procedure illustrated in FIG. 5, the new newest sequence number is within the same block as the old sequence number, the block is not zeroed to avoid losing reception information between the old and new newest sequence number. In a bit-wise resetting, the reception information may be set using the modulo operation described above, i.e. the newest sequence number modulo 1024.

In an embodiment, a hash function is used to access reception information for frames, as illustrated in FIG. 6. The updating 715 of reception information described above for reception information stored in a sequence memory according to FIG. 4, may be applied also for the reception information stored in a hash table entry as illustrated in FIG. 6. However, then the re-setting, e.g. zeroing, of the reception information and setting, e.g. reception information is set as 1, may be performed through execution of the hash function described above with reference to FIG. 6.

The apparatus 200 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, constitute the interface 202 providing one, two or more ports for redundant communications of frames.

An embodiment provides a record medium 210 storing a data structure for detecting duplicate frames received at a redundant port connecting a node to a communications network, whereby frames are identified by including a sequence number associated with a source, said data structure comprising, a source address stored in association with a newest sequence number of frames received from the source address at the redundant port, and a memory pointer to reception information determined for each frame within a window of frames from the source by corresponding sequence numbers, said window comprising sequence numbers preceding the newest sequence number and associated with reception information of a corresponding frame at the redundant port. An apparatus and/or a computer program product according to an embodiment may operate on information read from the data structure and/or update the data structure.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 200 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

In an embodiment, a node receiving a frame comprises a plurality of redundant ports and a newest sequence number of frames received from a source is determined for each redundant port. Accordingly, the above described processes may be performed for each redundant port.

An embodiment comprises a method, where frames are identified received at a redundant port connecting a node to a communications network by the frames including a sequence number associated with a source, receiving a frame at the redundant port from a source, determining a newest sequence number of frames received from the source at the node, determining a window of frames from the source by corresponding sequence numbers, said window comprising sequence numbers preceding the newest sequence number and associated with reception information of a corresponding frame at the node, relaying the frame by the node, when a sequence number of the received frame is within the window and the reception information indicates a first reception of the frame at the node. Accordingly, a windowing according to an embodiment may be applied as a common windowing for all ports. In this way the windows may be updated by frames received via any of the redundant ports. Since the windowing is node specific, only one sequence and corresponding sequence memory are needed. The embodiment may be implemented using the apparatus and data structure described above.

In an embodiment, where a common windowing for all ports is used, a newest sequence number of frames received from a source may be determined on the basis of frames received via any of the redundant ports. Then a window of frames received from the source by corresponding sequence numbers may be determined, said window comprising sequence numbers preceding the newest sequence number and associated with reception information of a corresponding frame. A received frame may be relayed, when a sequence number of the received frame is within the window and the reception information indicates a first reception of the frame at the node.

The steps/points, and related functions described above in FIGS. 5 and 7 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The present invention is applicable to network node and corresponding component, and/or to any communication system or any combination of different communication systems that support redundancy in communications. The communication system may be a fixed communication system or a wireless communication system or a communication system utilizing both fixed networks and wireless networks. The protocols used, the specifications of communication systems develop rapidly. Such development may require extra changes to an embodiment. Therefore, all words and expressions should be interpreted broadly and they are intended to illustrate, not to restrict, the embodiment.

Apparatuses, such as network nodes, or corresponding network node components and/or other corresponding devices or apparatuses implementing the functionality of a corresponding apparatus described with an embodiment comprise not only prior art means, but also means for identifying frames received at a redundant port connecting a node to a communications network by the frames including a sequence number associated with a source, receiving a frame at the redundant port from a source, determining a newest sequence number of frames received from the source at the node, determining a window of frames from the source by corresponding sequence numbers, said window comprising sequence numbers preceding the newest sequence number and associated with reception information of a corresponding frame at the node, relaying the frame by the node, when a sequence number of the received frame is within the window and the reception information indicates a first reception of the frame at the node.

In addition, they may comprise means for dropping a received frame, when the received frame has been received within a window comprising sequence numbers preceding the newest sequence number and associated with reception information of a corresponding frame at the redundant port.

More precisely, the various means comprise means for implementing functionality of a corresponding apparatus described with an embodiment and it may comprise separate means for each separate function, or means may be configured to perform two or more functions. Present apparatuses comprise processors and memory that can be utilized in an embodiment. For example, the DAN 220 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a network node or a corresponding network node component may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

For example, an apparatus according to an embodiment may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
identifying frames received at a redundant port connecting a node to a communications network by using a sequence number associated with a source, the sequence number being included in the frames;
receiving a frame at the redundant port from the source;
determining a newest sequence number of frames received from the source at the node;
determining a first window of frames from the source by corresponding sequence numbers, said first window comprising sequence numbers preceding the newest sequence number and associated with reception information of a corresponding frame at the node;
determining a second window of frames from the source by corresponding sequence numbers, said second window comprising sequence numbers following the newest sequence number;
relaying the frame by the node in response to a sequence number of the received frame being within the first window and the reception information indicating a first reception of the frame at the node; and
updating positions of the windows within a sequence window using a sequence number space in response to the sequence number of the received frame being within the second window, wherein the first window with sequence numbers preceding the newest sequence number comprises received and non-received frames from the source at the redundant port.

2. The method according to claim 1, wherein a node comprises a plurality of redundant ports and a newest sequence number of frames received from a source is determined on the basis of received frames via any of the redundant ports, the method further comprising:
determining a window of frames received from the source by corresponding sequence numbers, said window comprising sequence numbers preceding the newest sequence number and associated with reception information of a corresponding frame; and
relaying a frame received by the node, when a sequence number of the received frame is within the window and the reception information indicates a first reception of the frame at the node.

3. The method according to claim 1, wherein a node comprises a plurality of redundant ports and a newest sequence number of frames received from a source is determined for each redundant port, the method further comprising:
determining at each redundant port a window of frames from the source by corresponding sequence numbers, said window comprising sequence numbers preceding the newest sequence number and associated with reception information of a corresponding frame at each redundant port; and
relaying a frame received by a redundant port, when a sequence number of the received frame is within the window determined for the redundant port and the reception information indicates a first reception of the frame at the redundant port.

4. The method according to claim 1, wherein a node comprises a plurality of redundant ports, the method further comprising:
relaying the frame from a first redundant port to another redundant port of the node, when the sequence number of the received frame precedes the newest sequence number and the received frame has been received earlier by the first redundant port.

5. The method according to claim 1, further comprising:
determining a second window of frames from the source by corresponding sequence numbers, said second window comprising sequence numbers following the newest sequence number; and
relaying a frame received by a redundant port, when a sequence number of the received frame is within the second window.

6. The method according to claim 1, further comprising:
dropping a received frame by a redundant port, when the received frame has been received within a window comprising sequence numbers preceding the newest sequence number and associated with reception information of a corresponding frame.

7. The method according to claim 1, wherein sequence numbers are assigned to frames from each source from a rotational sequence of sequence numbers, the method further comprising:
determining a second window of frames from the source by corresponding sequence numbers, said second window comprising sequence numbers following the newest sequence number; and
dropping a frame received by a redundant port, when a sequence number of the fame is within a third window between the second window and the window comprising sequence numbers preceding the newest sequence number and associated with reception information of a corresponding frame.

8. The method according to claim 1, further comprising:
receiving a frame with a sequence number at a redundant port;
determining the received sequence number as a newest sequence number when the received sequence number follows a current newest sequence number; and
setting reception information of frames between the newest sequence number and the previous newest sequence number to indicate zero receptions of each frame.

9. The method according to claim 1, wherein a newest sequence number is associated with aging information that invalidates the newest sequence number of frames and reception information associated with frames preceding the newest sequence number after a predetermined time.

10. The method according to claim 1, wherein reception information of a frame is stored to a hash table entry by a hash function over the source address, the received sequence number and the redundant port receiving the frame.

11. The method according to claim 1, wherein reception information of a frame is stored in a sequence of indicators each of which corresponds to a frame with a sequence number within a window comprising sequence numbers preceding the newest sequence number and associated with reception information of a corresponding frame.

12. The method according to claim 1, wherein a windowing used for duplicate detection is updated, the method further comprising:
storing reception information corresponding to sequence numbers of frames, wherein the reception information is arranged into blocks comprising reception information of a plurality of frames;
re-setting the reception information of the blocks between a block including the newest sequence number and a block including a previous newest sequence number; and
setting the reception information of the newest frame to indicate a reception of the newest frame.

13. The method according to claim 1, wherein a node provides redundant communications by connecting to a communications network on a data link layer with a plurality of redundant ports.

14. The method according to claim 1, wherein a node comprises a plurality of redundant ports implementing different data link layer protocols.

15. The method according to claim 1, wherein a redundant port operates according to a data link layer protocol comprising at least one from a group comprising: IEEE 802.3 Ethernet and IEEE 802.11 Wireless Local Area Network, WLAN.

16. The method according to claim 1, wherein a redundant port operates according to one or more of redundancy protocols including a parallel redundancy protocol and high-availability seamless redundancy protocol.

17. An apparatus comprising at least one processor, and at least one memory including computer program code, the at least one memory and the computer program code configured to, with the at least one processor, cause the apparatus at least to perform a method comprising:
identifying frames received at a redundant port connecting a node to a communications network by the frames including a sequence number associated with a source the sequence number being included in the frames;
receiving a frame at the redundant port from the source;
determining a newest sequence number of frames received from the source at the node;
determining a first window of frames from the source by corresponding sequence numbers, said first window comprising sequence numbers preceding the newest sequence number and associated with reception information of a corresponding frame at the node;
determining a second window of frames from the source by corresponding sequence numbers, said second window comprising sequence numbers following the newest sequence number;
relaying the frame by the node in response to a sequence number of the received frame being within the first window and the reception information indicating a first reception of the frame at the node; and
updating positions of the windows within a sequence window using a sequence number space in response to the sequence number of the received frame being within the second window, wherein the first window with sequence numbers preceding the newest sequence number comprises received and non-received frames from the source at the redundant port.

18. A computer-readable medium storing instructions that, when executed by a processing device, perform operations comprising:
identifying frames received at a redundant port connecting a node to a communications network by the frames including a sequence number associated with a source the sequence number being included in the frames;
receiving a frame at the redundant port from the source;
determining a newest sequence number of frames received from the source at the node;
determining a first window of frames from the source by corresponding sequence numbers, said first window comprising sequence numbers preceding the newest sequence number and associated with reception information of a corresponding frame at the node;
determining a second window of frames from the source by corresponding sequence numbers, said second window comprising sequence numbers following the newest sequence number;
relaying the frame by the node in response to a sequence number of the received frame being within the first window and the reception information indicating a first reception of the frame at the node; and
updating positions of the windows within a sequence window using a sequence number space in response to the sequence number of the received frame being within the second window, wherein the first window with sequence numbers preceding the newest sequence number comprises received and non-received frames from the source at the redundant port.

* * * * *